(12) United States Patent
Neumann

(10) Patent No.: US 9,174,878 B2
(45) Date of Patent: Nov. 3, 2015

(54) POROUS CARBON PRODUCT AND METHOD FOR THE PRODUCTION THEREOF

(75) Inventor: Christian Neumann, Hungen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 223 days.

(21) Appl. No.: 13/575,569

(22) PCT Filed: Jan. 25, 2011

(86) PCT No.: PCT/EP2011/050939
§ 371 (c)(1),
(2), (4) Date: Jul. 26, 2012

(87) PCT Pub. No.: WO2011/092149
PCT Pub. Date: Aug. 4, 2011

(65) Prior Publication Data
US 2012/0301387 A1   Nov. 29, 2012

(30) Foreign Application Priority Data

Jan. 27, 2010  (DE) .......................... 10 2010 005 954

(51) Int. Cl.

| C01B 31/02 | (2006.01) |
|---|---|
| C04B 35/52 | (2006.01) |
| C03B 19/14 | (2006.01) |
| C04B 38/00 | (2006.01) |
| H01M 4/133 | (2010.01) |
| H01M 4/1393 | (2010.01) |
| H01M 4/587 | (2010.01) |
| C04B 111/00 | (2006.01) |

(52) U.S. Cl.
CPC .............. *C04B 35/521* (2013.01); *C01B 31/02* (2013.01); *C03B 19/14* (2013.01); *C04B 38/0032* (2013.01); *H01M 4/133* (2013.01); *H01M 4/1393* (2013.01); *H01M 4/587* (2013.01); *C04B 2111/00853* (2013.01); *Y02E 60/122* (2013.01)

(58) Field of Classification Search
CPC ....................................................... C01B 31/02
See application file for complete search history.

(56) References Cited

U.S. PATENT DOCUMENTS

| 4,203,744 A | 5/1980 | Schultz et al. |
|---|---|---|
| 4,204,851 A | 5/1980 | Nolan |
| 4,263,268 A | 4/1981 | Knox et al. |
| 7,829,222 B2 * | 11/2010 | Takei et al. ................ 429/231.4 |
| 2004/0091415 A1 | 5/2004 | Yu et al. |
| 2005/0000250 A1 | 1/2005 | Humbach et al. |
| 2005/0129604 A1 | 6/2005 | Pak et al. |
| 2005/0169829 A1 | 8/2005 | Dai et al. |
| 2005/0247080 A1 | 11/2005 | Fritsche et al. |
| 2006/0159718 A1 | 7/2006 | Rathenow et al. |
| 2009/0044606 A1 | 2/2009 | Dai et al. |
| 2010/0307197 A1 | 12/2010 | Ochs et al. |
| 2011/0140296 A1 | 6/2011 | Dai et al. |

FOREIGN PATENT DOCUMENTS

| DE | 29 46 688 | 6/1980 |
|---|---|---|
| DE | 20 2004 006 86 U1 | 9/2004 |
| WO | 98/05411 A1 | 12/1998 |
| WO | 03/006372 A1 | 1/2003 |
| WO | 2004024641 A1 | 3/2004 |

OTHER PUBLICATIONS

Zhaohui Hou et al. "High Rate Capability of Ordered Mesoporous Carbon With Platelet Graphitic Pore Walls". Materials Letters, vol. 65 (2011), p. 897-900.
Zhi-Guo Shi et al. "Synthesis of a Silica Monolith With Textural Pores and Ordered Mesopores". Microporous and Mesoporous Materials, vol. 68 (2004), p. 55-59.
J.I. Paredes et al. "A Microscopic View of Physical and Chemical Activation in the Synthesis of Porous Carbons". Langnuar, vol. 22, 2006, p. 9730-9739.
Sang Hoon Joo et al. "Ordered Nanoporous Arrays of Carbon Supporting High Dispersions of Platinum Nanoparticles". Nature, vol. 412, Jul. 12, 2001, p. 169-172, p. 470.
Ryong Roo et al. "Ordered Mesoporous Carbons". Advanced Matter, 2001, vol. 13, No. 9, p. 677-681.
An-Hui Lu et al. "Synthesis of Ordered Mesoporous Carbon With Bimodal Pore System and High Pore Volume". Advanced Matter, 2003, vol. 15, No. 19, p. 1602-1606.
R. Brückner, "Silicon Dioxide", Encyclopedia of Applied Physics, vol. 18 (1997), p. 101-131.
S. Sakaguchi, "Consolidation of silica glass soot body prepared by flame hydrolysis reaction" J. of Non-Crystalline Solids, vol. 171, pp. 249-258 (1994), partial Abstract only.
J. Sanghera, Infrared Fiber Optics, pp. 42-43 (1998).

* cited by examiner

*Primary Examiner* — Stuart Hendrickson
(74) *Attorney, Agent, or Firm* — Tiajoloff and Kelly LLP

(57) ABSTRACT

A known method for producing a porous carbon product comprises producing a monolithic template from inorganic matrix material having pores connected to each other, infiltrating the pores of the template with carbon or a carbon precursor substance forming a green body framework containing carbon surrounded by matrix material and calcining the green body framework forming the porous carbon product. In order to provide a method proceeding herefrom which permits cost-effective production of a product from porous carbon, according to the invention the production of the template comprises a soot separation process in which a hydrolyzable or oxidable starting compound of the matrix material is supplied to a reaction zone, therein converted to matrix material particles by hydrolysis or pyrolysis, the matrix material particles are agglomerated or aggregated and formed to the template.

13 Claims, 3 Drawing Sheets

POROUS CARBON PRODUCT AND METHOD FOR THE PRODUCTION THEREOF

The present invention refers to a method for producing a porous carbon product, the method comprising the following steps:
(a) producing a monolithic template of inorganic matrix material that exhibits interconnected pores of the matrix material,
(b) infiltrating the pores of the template with carbon or a carbon precursor substance while forming a carbon-containing green-body skeleton surrounded by matrix material, and
(c) calcining the green body skeleton so as to form the porous carbon product.

Furthermore, the present invention refers to a carbon product containing porous carbon having a hierarchical pore structure.

Moreover, the invention is concerned with a matrix material for use as a template for producing a molded body of porous carbon.

Monolithic molded bodies of porous carbon are distinguished in relation to their mechanical robustness by a low weight, high thermal conductivity and adsorption power, and moreover they exhibit a high chemical and thermal resistance.

Porous carbon is used in electrodes for fuel cells, supercapacitors and electrical accumulators (secondary batteries) and as an adsorbent for liquids and gases, as a storage medium for gases, as a carrier material in chromatographic applications or catalytic processes and as a material in mechanical or medical engineering.

PRIOR ART

Many methods that result in different characteristics especially with respect to porosity, pore size distribution and morphology of the pores are known in porous carbon production.

DE 20 2004 006 867 U1, for instance, describes the production of a porous carbon-based molded body for use as a cell culture carrier by forming a mixture of carbonizable plastic particles and inorganic filler particles (such as salts) to obtain a semi-finished molded part, and by subsequently carbonizing the same in a non-oxidizing atmosphere. This yields a carbon-based molded body from which the particulate fillers are removed by washing or burning, whereby the pores are exposed.

Applications of the carbon-based molded bodies for electrodes of rechargeable lithium ion batteries require, however, an electrode material that is able to reversibly insert and remove (intercalate) lithium. Charging times that are as short as possible are here desired for the battery. It has been found that the reactive surface of the electrode, which is composed of its geo-metric surface and the additional surface ensuing from internal porosity, is a key parameter for "quick chargeability".

Particularly large inner surfaces comprise so-called "carbon aerogels"; these are produced by the pyrolysis of aerogels on the basis of organic compounds. On account of the large surface, however, electrode materials made therefrom exhibit a relatively high "charge loss" that substantially manifests itself as irreversible loss during the first intercalation of lithium.

Known are also methods for producing porous carbon using a temporary preform of porous material (a so-called template). Such a method is described in DE 29 46 688 A1, which also reveals a method for producing a carbon product according to the aforementioned type. Carbon is here deposited in the pores of a template of inorganic matrix material that has a surface of at least 1 $m^2/g$. $SiO_2$ gel, porous glass, aluminum oxide or other porous heat-resistant oxides are indicated as suitable matrix materials for the template. The matrix material has a porosity of at least 40% and a mean pore size in the range of 3 nm to 2 μm.

Carbon is here deposited in the pores of the template using a polymerizable organic material that is introduced as a liquid or as a gas and is subsequently polymerized within the pores and carbonized. After polymerization and carbonization the inorganic matrix material of the template is removed, e.g. by dissolution in NaOH or hydrofluoric acid.

This yields a carbon-based molded body having a pore structure corresponding approximately to the material distribution of the template.

Ease of access to the inner surfaces is however also decisive for a good and quick charging capacity. In this context a so-called "hierarchical porosity" turns out to be advantageous. Large surfaces can be provided by pores in the nanometer range. To enhance accessibility to these pores, they are ideally connected through a continuous macro-porous transportation system.

A carbon monolith with such a hierarchical pore structure made of macropores and mesopores according to the aforementioned type is described in US 2005/0169829 A1. The macropores have a pore size in the range of from 0.05 μm to 100 μm, preferably in the range of from 0.8 μm to 10 μm, and the mesopores have a pore size in the range of from 1.8 nm to 50 nm, preferably in the range of from 5 nm to 30 nm. The wall thicknesses of the skeletal structure of the carbon monolith are within the range of from 100 nm to 20 μm.

For the preparation of the hierarchical pore structure a $SiO_2$ template is produced. To this end a dispersion of silica beads with diameters of 800 nm to 10 μm and of a polymerizable substance are introduced into a mold in which the dispersion is heated, so that polymerization yields a porous silica gel that is dried after removal of the excessive liquid and completely polymerized.

The pores of the $SiO_2$ template obtained in this way are subsequently impregnated with a precursor substance for carbon, the carbon precursor substance is carbonized to obtain carbon and the $SiO_2$ template is subsequently removed by dissolution in HF or NaOH.

The manufacture of the known $SiO_2$ template is very time- and material-consuming, and this is particularly unacceptable for applications for mass articles such as secondary batteries in the case of which low productions costs are of decisive importance.

TECHNICAL OBJECT

It is the object of the present invention to provide a method permitting a low-cost production of a product made of porous carbon.

It is also the object of the present invention to indicate a product of porous carbon that has a hierarchical pore structure and is distinguished by a high and fast charging capacity when used in an electrode of a lithium ion battery.

It is also the object of the present invention to indicate a matrix material for use as a template.

As for the method, this object starting from a method of the aforementioned type is achieved according to the invention in that the preparation of the template comprises a soot deposition process in which a hydrolyzable or oxidizable start compound of the matrix material is supplied to a reaction zone and converted therein by hydrolysis or pyrolysis to form matrix material particles, the matrix material particles are agglomerated or aggregated and shaped into the template.

In the method according to the invention the production of the template comprises a soot deposition process. A liquid or gaseous start substance is here subjected to a chemical reaction (hydrolysis or pyrolysis) and deposited from the gas phase as a solid component on a deposition surface. The reaction zone is e.g. a burner flame or an electric arc (plasma). With the help of such plasma or CVD methods, which are e.g. known under the names OVD, VAD, MCVD, PCVD or FCVD methods, synthetic quartz glass, tin oxide, titanium nitride and other synthetic materials are produced on an industrial scale.

It is here essential for the suitability of the deposited matrix material for the production of a template that the matrix material should be present as porous soot on the deposition surface, which may e.g. be a vessel, a mandrel, a plate or a filter. This is ensured in that the temperature of the deposition surface is kept so low that any dense sintering of the deposited matrix material is prevented. A so-called "soot body" or "soot dust" is obtained as the intermediate product.

When compared with the production method through the "sol-gel route", the soot deposition method is an inexpensive method which permits a low-cost production of templates for carbon-based molded bodies on an industrial scale.

In this connection it has turned out to be advantageous that an anisotropic mass distribution of the matrix material with hierarchical pore structure is produced by means of the soot deposition process.

During gas phase deposition primary particles of the matrix material are formed in the reaction zone with particles sizes in the nanometer range, the primary particles agglomerating on their way to the deposition surface and being obtained in the form of more or less spherical agglomerates or aggregates on the deposition surface, which will also be called "secondary particles" hereinafter. Depending on the site of formation within the reaction zone and their route to the deposition surface, the secondary particles consist of a different number of primary particles and therefore also show a broad particle size distribution as a rule. Particularly small cavities and pores in the nanometer range, i.e. so-called mesopores, are present within the secondary particles—between the primary particles, whereas larger cavities or pores are formed between the individual secondary particles.

When such a matrix material is used for producing a template, the inner surfaces of the pores and cavities are occupied by the carbon-containing start substance during infiltration, so that the pore structure given in the template is transferred more or less exactly to the carbon-based product which therefore has a hierarchical structure, which corresponds to the matrix material, with an oligomodal pore size distribution.

In the soot deposition process the matrix material may accrue in the form of soot powder which is then further processed by way of granulation, press, slurry or sintering processes into intermediate products or into the template. Granules or flakes can here be named as intermediate products. Preferably, however, the soot deposition process comprises a layerwise deposition of the matrix material particles on a carrier moved relative to the reaction zone so as to form a soot body.

The monolithic soot body obtained thereby, or parts thereof, is directly useable as a template, the monolithic structure facilitating the infiltration according to method step (b). The layerwise deposition of the matrix material particles contributes to an anisotropic mass distribution in the finished matrix material. The reason is that the soot body obtained by layerwise deposition of the matrix-material particles is bound to have a layer structure in the case of which the density between the individual layers differs from the density within the layers of the matrix material. The layer structure of the soot body, or of the template produced therefrom, respectively, can be found again in the carbon product and manifests itself in a plate-like or flake-like morphology.

In this connection it has turned out to be particularly useful when the matrix material particles are deposited on a cylindrical outer surface of an elongated carrier rotating about its longitudinal axis while forming a hollow cylindrical soot body.

This gas phase deposition method is generally known as "OVD method" (outside vapor deposition). Matrix material particles are here deposited on the cylindrical outer surface of a carrier rotating about its longitudinal axis, resulting in a "spiral winding" of the deposited matrix-material particle layer.

The layer-like anisotropic mass distribution of the template produced thereby also achieves a pronounced layer structure in the carbon product made therefrom. Due to this morphology a separation between layers may easily occur, so that the carbon product in such a case is obtained in the form of bent flakes (or platelets or plates), each platelet having one layer, but normally a plurality of layers. This carbon product is e.g. suited as a start material for the production of the electrode of a lithium ion battery, and it is distinguished due to its hierarchical pore structure by a high and fast charging capacity.

Advantageously, the soot layers are deposited at a mean thickness ranging from 10 µm to 200 µm, preferably ranging from 30 µm to 100 µm.

Layer thicknesses of less than 10 µm may lead to a low mechanical stability of the soot body. In the case of soot layers having a thickness of more than 200 µm, it gets more and more difficult to infiltrate them in a uniform manner.

It has turned out to be advantageous when a template is made having a mean relative density in the range of 10% to 25%, preferably of less than 20%, of the theoretical specific density of the matrix material.

The lower the density of the template the smaller are the loss of matrix material and the efforts for removing the same. At mean densities of the template of less than 10%, however, a low mechanical stability is obtained, which renders the handling of the template more difficult. The density of the porous template is e.g. set by the surface temperature in the soot deposition process or by pressure and/or temperature during pressing of particulate matrix material with respect to the template.

In a preferred variant of the method according to the invention the inorganic matrix material is removed after calcining according to method step (c).

The inorganic material just serves here as a mechanically and thermally stable skeleton for depositing and calcining the carbon precursor substance. The resulting carbon product is essentially free of matrix material, so that the surface area previously occupied by matrix material is also freely accessible. The carbon product therefore manifests a high capacity in applications where a large surface is also important.

In an alternative, equally preferred procedure, which particularly aims at the production of an electrode for a lithium ion battery made from the carbon product, it is intended that the matrix material is an oxidic material, and that the carbon product and at least part of the matrix material are used as start material for producing the electrode.

During short-circuiting in lithium ion batteries strongly exothermal reactions and explosion-like burning of the accumulators may happen. A proportion of matrix material of oxidic material can reduce this risk because it additionally stabilizes the electrodes. It has turned out to be useful when the carbon product is divided into finely divided carbon of porous particles.

In the method according to the invention the carbon product is normally present as a monolith or with plate-like or flake-like morphology and can be easily divided into smaller particles. The particles obtained after division exhibit the hierarchical pore structure which is due to the soot deposition of the template and are e.g. further processed by means of standard paste or slurry methods into molded bodies or layers.

Preferably, the matrix material is $SiO_2$.

Synthetic $SiO_2$ can be produced at relatively low costs on an industrial scale by means of soot deposition methods using inexpensive start substances. The $SiO_2$ template withstands high temperatures during calcination. The upper temperature limit is predetermined by the start of the reaction of $SiO_2$ with carbon into SiC (at about 1000° C.). The removal of the matrix material in the form of synthetic $SiO_2$ according to method step (d) is carried out by way of chemical dissolution.

The further processing of the template obtained according to method step (a) is carried out with the help of measures known from the prior art.

For instance, an aftertreatment of the template may turn out to be advantageous when the inner surface is provided with functional groups. In the case of a $SiO_2$ template a functionalization is e.g. recommended using silanes for hydrophobization, siloxanes, silazanes or other organic materials. Furthermore, for increasing the free surface prior to infiltration according to method step (b) a thermal treatment of the $SiO_2$ template in combination with an aluminum-containing coating for conversion into aluminosilicate zeolites is possible.

The infiltration of the pores of the template with carbon or a carbon precursor substance is carried out by using fluid (gaseous or liquid) start substances. Solutions of mesophase pitch or naphtol are e.g. suited as graphitic carbon precursor substances. Non-graphitic carbon precursor substances are often used as well, e.g. saccharose, fructose or glucose. The corresponding substances are infiltrated in dissolved form into the template. Suitable solvents for the said graphitic precursor substances are e.g. chloroform and tetrahydrofuran (THF), while the said non-graphitic precursor substances are water-soluble.

The infiltration of the precursor substances into the template is carried out with the help of the methods known in the prior art; special mention should here be made of immersing, pumping and swiveling.

The calcination of the green body skeleton according to method step (c) is carried out at a high temperature under a gas which is free of oxygen, if possible, or under vacuum.

The removal of the inorganic matrix material according to method step (d) is carried out by chemical dissolution. In the case of $SiO_2$ matrix material, particularly acids (such as hydrofluoric acid) or bases (such as sodium hydroxide) should be mentioned as solvents.

After removal of the matrix material the pore-containing molded body obtained in this way is washed and dried and subjected to a possible aftertreatment for further finishing of the base material. Reference should here particularly be made to calcining under vacuum or inert gas at high temperatures of up to 3000° C. for further graphitization or calcining under an oxidizing atmosphere at temperatures of up to about 400° C. for the selective oxidation of active non-graphitic centers within the monolith.

As for the carbon product, the aforementioned object starting from a carbon product of the aforementioned type is achieved according to the invention in that it is present in the form of porous carbon flakes.

Such carbon flakes are obtained during their production via a "template method" when the template is produced by layerwise soot deposition on the basis of the method according to the invention. The carbon flakes or platelets obtained thereby have a layer-like morphology and comprise one carbon layer, but normally a plurality of individual carbon layers. Each carbon layer consists of a porous carbon skeleton.

The carbon flakes according to the invention consist of porous carbon having a hierarchical pore structure which is obtained by virtue of their production by gas phase deposition, as has already been explained in more detail by reference to the method according to the invention.

They are particularly well suited for the production of the electrodes of rechargeable lithium ion batteries having a high and fast charging capacity. The electrode is here present in the form of a layer of carbon particles. Transition resistances which may impair electron conduction and which may increase due to aging occur at the contact points between discrete individual particles. The carbon flakes according to the invention do not show this drawback, for these are not composed of discrete and movable individual particles, but they are formed by a carbon skeleton or by a plurality of coherent carbon skeletons.

The carbon skeleton is suited for occupation by nanoparticles and is thus also useable as an electrode material of an accumulator or battery, and also for the aforementioned applications.

Preferably, the carbon flakes have a layer structure with a mean layer thickness in the range of from 10 μm to 200 μm, preferably in the range of from 30 μm to 100 μm.

The layer structure of the carbon flakes reflects the layer-like anisotropic mass distribution of the $SiO_2$ template. Layer thicknesses of less than 10 μm can lead to a small mechanical stability of the carbon flakes. Carbon flakes with a thickness of more than 200 μm are increasingly inhomogeneous over their thickness.

When carbon flakes are used for producing an electrode layer of a lithium ion battery, the layer thickness of the carbon flakes is ideally in the order of the thickness of the electrode layer. This avoids or reduces transition resistances between smaller discrete carbon particles.

For the production of such an electrode layer the carbon flakes are dispersed in a liquid and further processed by means of the known methods into the porous carbon layer.

As for the use as a template for making a product of porous carbon, the aforementioned object is achieved according to the invention in that a $SiO_2$ soot body is used for said purpose.

Synthetic $SiO_2$ can be produced at relatively low costs on an industrial scale by means of soot deposition methods using inexpensive start substances. Soot bodies of synthetic $SiO_2$ are distinguished by a high thermal resistance and by an anisotropic pore distribution that makes them directly suited for use as a template.

EMBODIMENT

The invention will now be explained with reference to an embodiment and a drawing in more detail. In detail, FIG. 1 shows an apparatus for producing a $SiO_2$ soot body in a schematic illustration;

Figure 1:
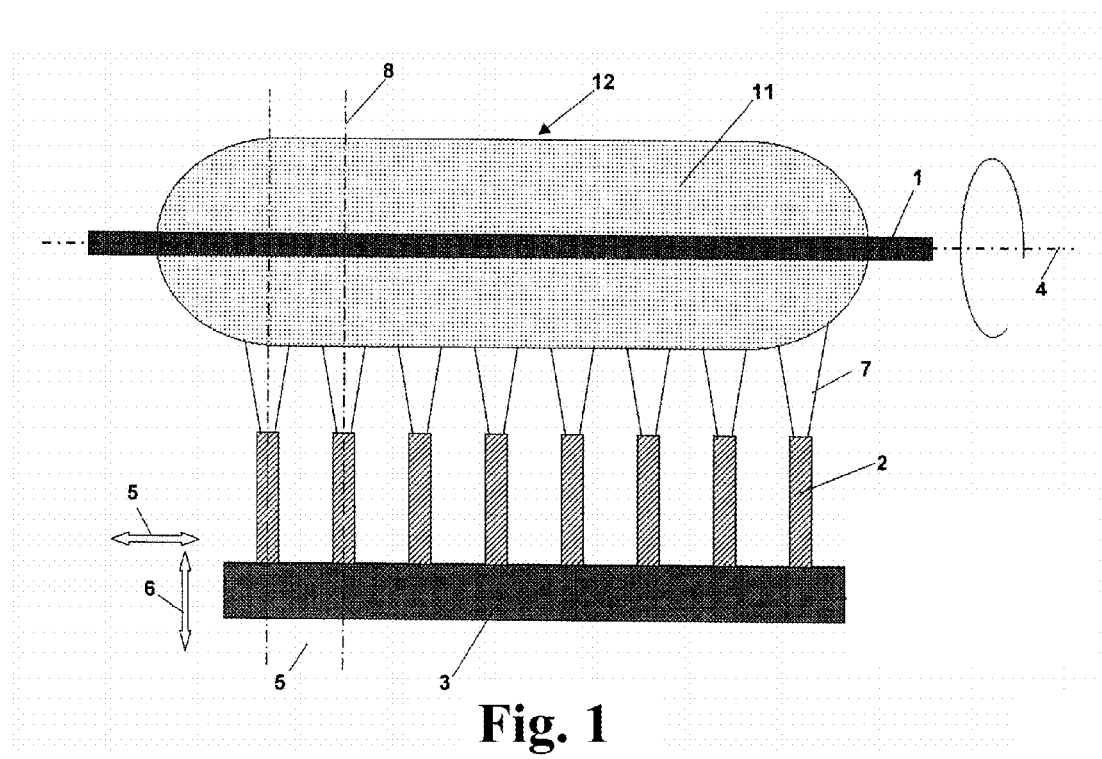

The apparatus shown in FIG. 1 serves to produce a $SiO_2$ soot body. Several series-arranged flame hydrolysis burners 2 are disposed along a carrier tube 1 of aluminum oxide. The flame hydrolysis burners 2 are mounted on a joint burner block 3 which is moved to and fro in parallel with the longitudinal axis 4 of the carrier tube 1 between two turning points that are stationary relative to the longitudinal axis 4, and which is movable in a direction perpendicular thereto, as illustrated by the directional arrows 5 and 6. The burners 2 consist of quartz glass; their mutual distance is 15 cm.

Each of the flame hydrolysis burners 2 has assigned thereto a burner flame 7 the main propagation direction 8 of which extends in a direction perpendicular to the longitudinal axis 4 of the carrier tube 1. With the help of the flame hydrolysis burners 2 $SiO_2$ particles are deposited on the cylindrical outer surface of the carrier tube 1 rotating about its longitudinal axis 4, so that the blank 11 is built up layer by layer with an outer diameter of 400 mm The individual $SiO_2$ soot layers have a mean thickness of about 50 μm.

Each of the flame hydrolysis burners 2 is fed with oxygen and hydrogen as burner gases and with $SiCl_4$ as the feedstock material for the formation of the $SiO_2$ particles. The burner block 3 is here reciprocated with an amplitude of two burner distances (i.e. 30 cm). During the deposition process a mean temperature of about 1200° C. can be observed on the blank surface 12.

After completion of the deposition process a tube of porous $SiO_2$ soot (soot tube) with a length of 3 m, an outer diameter of 400 mm and an inner diameter of 50 mm is obtained. The temperature during the build-up process of the soot body is kept comparatively low, so that the $SiO_2$ soot material has a small mean relative density of 22% (based on the density of quartz glass 2.21 $g/cm^3$).

The soot tube is subjected to a CT examination (computer tomography). The soot tube is here penetrated over its length by X-rays. The images obtained thereby allow quantitative and qualitative statements on the $SiO_2$ mass distribution and intensity and homogeneity of the axial and radial layer structure of the soot tube.

Figure 2:
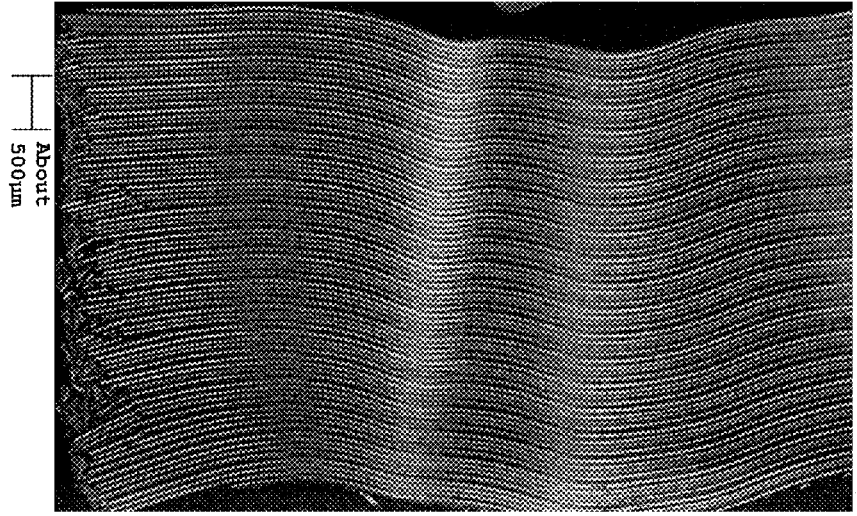
FIG. 2 shows a CT photograph of a soot body in a view taken in the direction of the longitudinal axis of the soot body.

FIG. 2 shows the corresponding CT image. In this imaging technique, areas of a relatively high density appear as bright surface areas. On the basis of distinct brightness differences one can clearly discern layers extending in parallel with one another with a layer thickness of about 50 μm.

Figure 3:
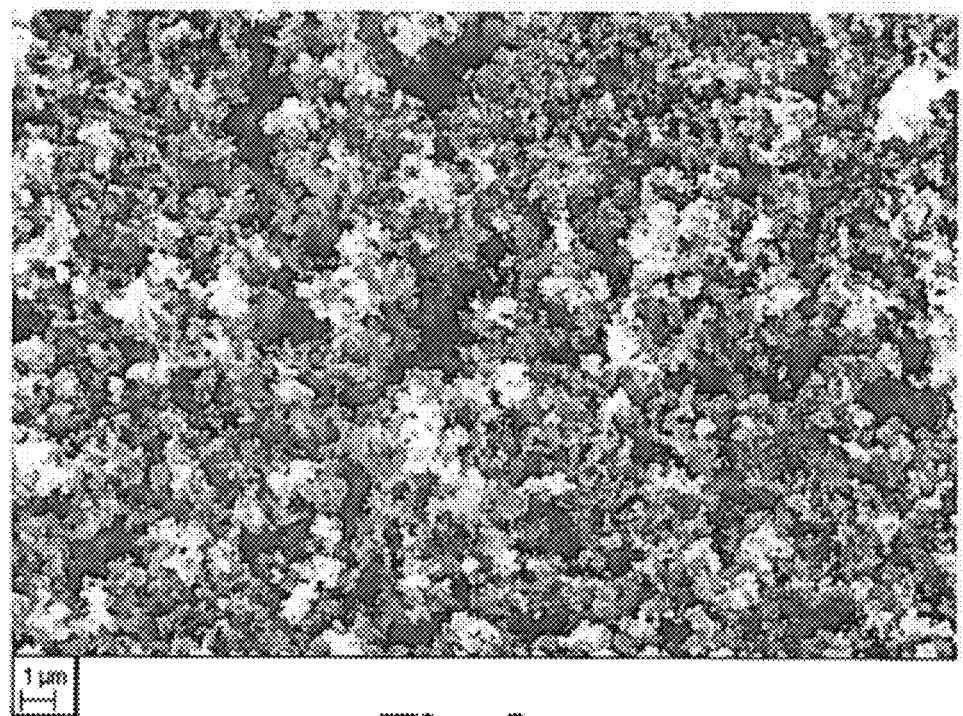
FIG. 3 shows a SEM photo of a template in the form of a $SiO_2$ soot body with hierarchical pore structure.
Figure 4:
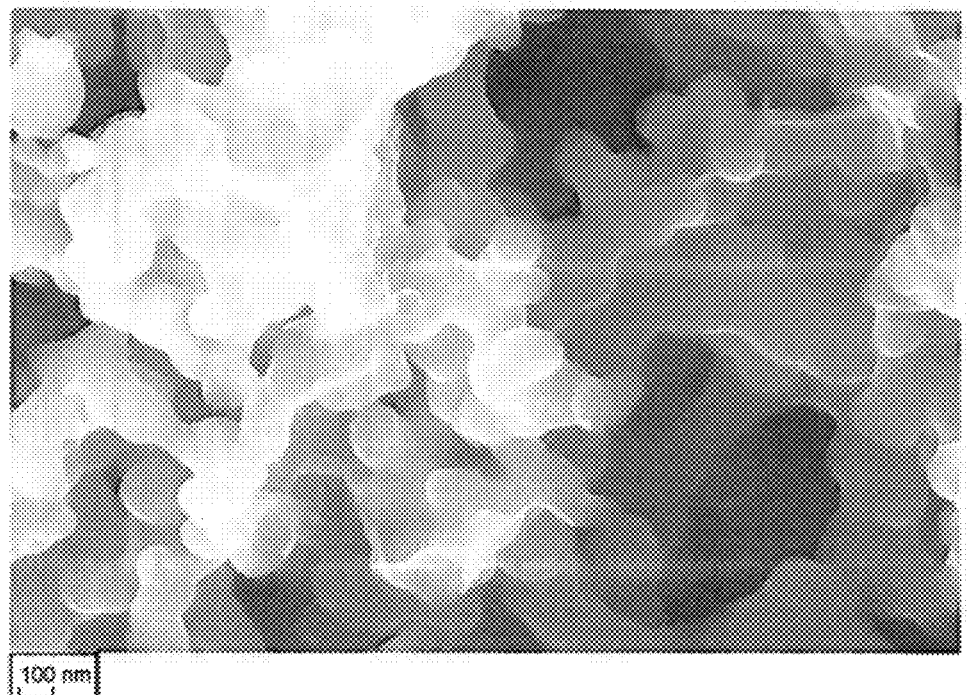
FIG. 4 shows a SEM photo of the $SiO_2$ soot body with a 10-fold magnification as compared with FIG. 3.

The SEM photos of the soot body according to FIGS. 3 and 4 show a skeletal structure having a multitude of coherent pores and cavities of different sizes. As can particularly clearly be seen in FIG. 4, the skeletal structure is composed of individual spherical and intergrown $SiO_2$ secondary particles. These form a finely fissured surface through which larger cavities extend in the form of channels. A measurement of the specific inner surface area according to the BET method (DIN ISO 9277, May 22003) shows measurement values of about 20 $m^2/g$.

The soot body is used as a template for the production of porous carbon. The soot body is here introduced into an immersion bath of a solution of mesophase pitch in THF. The impregnated material is subsequently dried. These impregnating and drying steps will be repeated until there is no longer a free pore volume of any significance.

The resulting green-body skeleton consisting of soot body and dried pitch layers is calcined by heating in nitrogen. A skeletal composite structure of quartz glass and carbon that has a specific (BET) surface area of about 100 $m^2/g$ is formed. The increase in the specific surface area as compared with the $SiO_2$ soot body might be due to a fine structuring of the carbon occupation.

The $SiO_2$ matrix material is removed by introducing the impregnated soot body into a hydrofluoric acid bath. After the $SiO_2$ skeleton has been etched away, the molded body which is obtained thereby and consists of porous carbon is washed and dried and subjected to a further calcining step under vacuum at a temperature of about 2500° C. for further graphitization.

The carbon product obtained thereby has a graphite-like layered configuration and is composed of a plurality of layers of plate-like or flake-like structures that are bent and can be easily crushed. The individual paper-like layers that have a mean thickness of about 50 μm are due to the original layer structure of the $SiO_2$ soot body.

Figure 5:
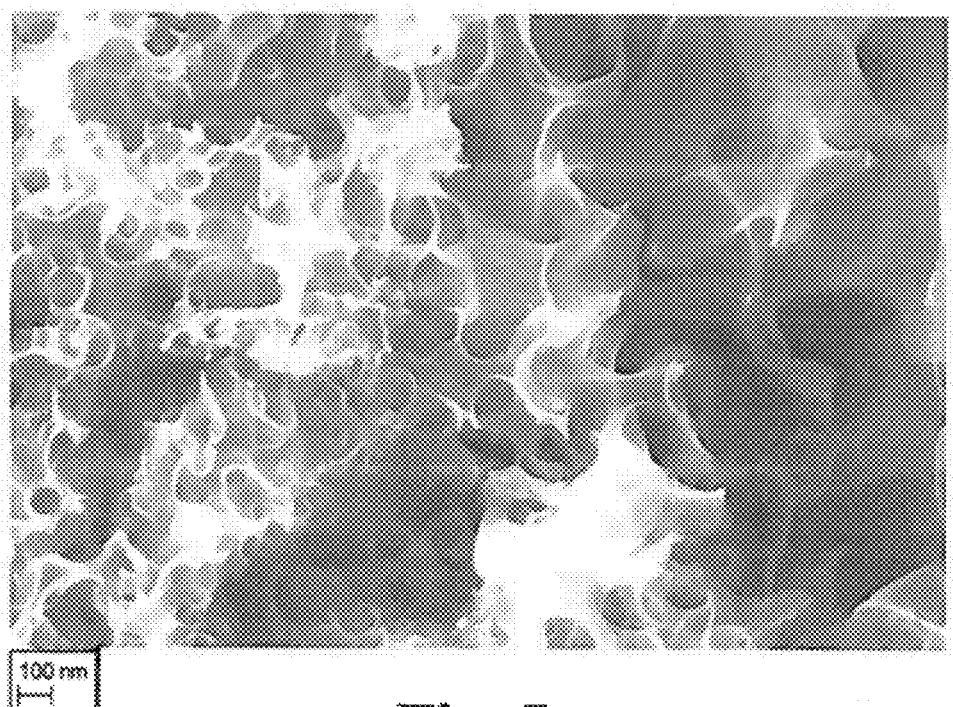
FIG. 5 shows a SEM photo of a carbon product obtained by using the soot body according to FIG. 3.

The SEM photo of FIG. 5 shows the pore structure of the resulting molded body of porous carbon. It shows negative imprints of the original spherical $SiO_2$ secondary particles and is also otherwise similar to the pore structure of the template. It is particularly distinguished by a hierarchical pore structure, with a multitude of relatively large pore channels (macropores) that extend through an otherwise finely fissured surface structure. A measurement of the specific inner surface area according to the BET method yields measurement values of approximately 200 $m^2/g$, i.e., about twice the specific surface area of the composite body of carbon and quartz glass.

Figure 6:
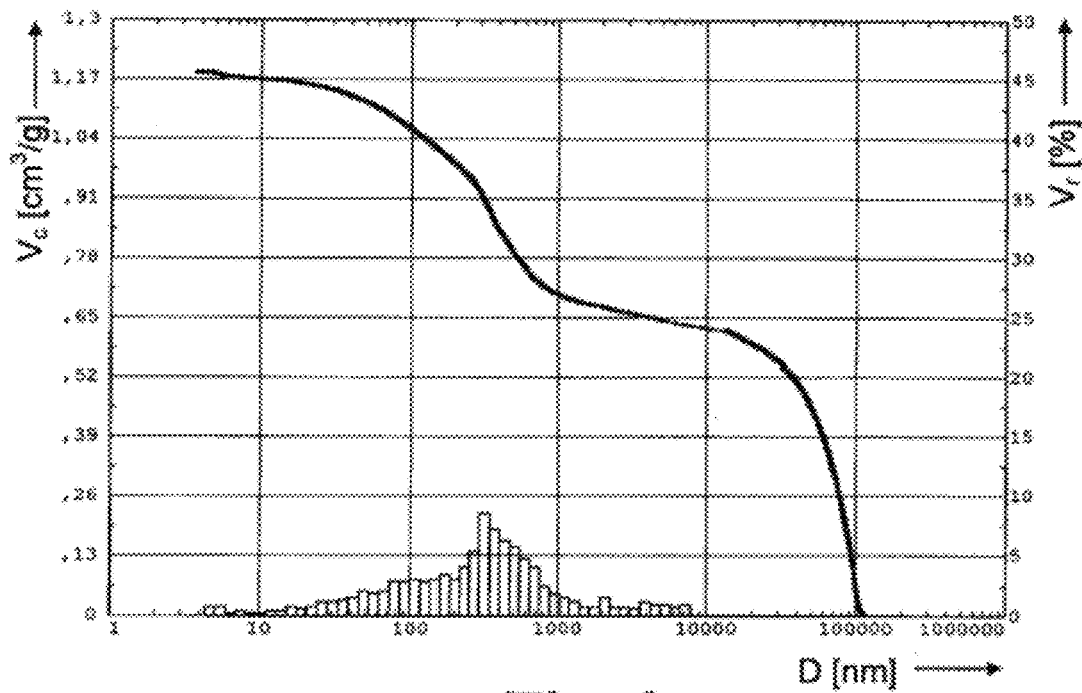
FIG. 6 shows a diagram on the pore size distribution of the carbon product according to FIG. 4, determined by mercury porosimetry.

The diagram of FIG. 6 shows the pore size distribution of the porous carbon. The cumulative pore volume Vc in [$cm^3/g$] is plotted on the left ordinate and the relative pore volume V in [%] on the right ordinate against the pore diameter D in [nm]. It must here be borne in mind that the illustrated measurement results were obtained by way of mercury porosimetry. The technique is based on the intrusion of the non-wetted liquid mercury into a porous system under pressure. This method provides reliable information on the pore size distribution, the pore volume, the apparent density and the true density in the range of macropores up to large mesopores, but not for pores in the nanometer range.

It can be seen that the porous carbon is distinguished by a broad pore size distribution that ranges from 5 nm to 100,000 nm and shows a maximum at a pore size of about 400 nm. The specific inner surface area determined therefrom is about 27 $m^2/g$. The discrepancy with respect to the value determined according to the BET method of about 200 $m^2/q$ can be explained in that the pores in the nanometer range that make up the greatest proportion relative to the total inner surface area cannot be encompassed by this measurement.

This carbon product is used as a start material for the production of an electrode of a rechargeable lithium ion battery. To this end it is comminuted and received in a dispersion and is processed with the help of the standard methods into the electrode. The plate-like or flake-like morphology of the particles and their broad pore size distribution as well as the hierarchical pore structure are here maintained. This is a precondition for a high and fast charging capacity of the lithium ion battery.

The invention claimed is:

1. A method for producing a porous carbon product, said method comprising:
   (a) producing a monolithic template of inorganic matrix material that exhibits interconnected pores of the matrix material, wherein the producing of the template comprises a soot deposition process in which a hydrolyzable or oxidizable start compound of the matrix material is supplied to a reaction zone and converted therein by either a flame or an electric arc so as to form matrix material particles, and the matrix material particles are agglomerated or aggregated and shaped into the template, (b) infiltrating the pores of the template with carbon or a carbon precursor substance while forming a carbon-containing green-body skeleton surrounded by the matrix material, (c) calcining the green body skeleton while forming the porous carbon product, and (d) removing the inorganic matrix material after the calcining.

2. The method according to claim 1, wherein an anisotropic mass distribution of the matrix material with hierarchical pore structure is produced by means of the soot deposition process.

3. The method according to claim 1 wherein the soot deposition process comprises a layerwise deposition of the matrix material particles on a carrier moved relative to the reaction zone while forming a soot body.

4. The method according to claim 3, wherein the matrix material particles are deposited on a cylindrical outer surface of an elongated carrier rotating about a longitudinal axis thereof as to form a hollow cylindrical soot body.

5. The method according to claim 3 wherein the soot layers are deposited at a mean thickness ranging from 10 μm to 200 μm.

6. The method according to claim 3 wherein the soot layers are deposited at a mean thickness ranging from 30 μm to 100 μm.

7. The method according to claim 1, wherein a template is made having a mean relative density in the range of 10% to 25%, of the theoretical specific density of the matrix material.

8. The method according to claim 1, wherein the carbon product is obtained in the form of porous carbon flakes.

9. The method according to claim 1, wherein the matrix material is an oxidic material, and the carbon product and at least part of the matrix material are provided as start material for producing an electrode for a lithium ion battery.

10. The method according to claim 1, wherein the carbon product is divided into finely divided carbon of porous particles.

11. The method according to claim 1, wherein the matrix material is $SiO_2$.

12. The method according to claim 1, wherein a template is made having a mean relative density in the range of 10% to 20%, of the theoretical specific density of the matrix material.

13. A method for providing a product of porous carbon, said method comprising:
providing a $SiO_2$ soot body by deposition of soot particles from gas phase from a burner flame; and
using the soot body as a template in forming the product of porous carbon.

* * * * *